(12) United States Patent
Bates

(10) Patent No.: US 9,779,613 B2
(45) Date of Patent: Oct. 3, 2017

(54) DISPLAY AND CONTROL OF PRE-DETERMINED AUDIO CONTENT PLAYBACK

(71) Applicant: Sonos, Inc., Santa Barbara, CA (US)

(72) Inventor: Paul Andrew Bates, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 125 days.

(21) Appl. No.: 14/321,024

(22) Filed: Jul. 1, 2014

(65) Prior Publication Data

US 2016/0005302 A1    Jan. 7, 2016

(51) Int. Cl.
G08B 25/00    (2006.01)
H04N 21/436   (2011.01)

(52) U.S. Cl.
CPC ..... G08B 25/008 (2013.01); *H04N 21/43615* (2013.01)

(58) Field of Classification Search
CPC .. G08B 25/008; G08B 25/001; G08B 25/002; G08B 25/004; G08B 25/005; G08B 25/006; G08B 25/009; G08B 25/14; G06F 3/165; H04N 21/4227; H04N 21/43615; H04R 3/12; H04R 27/00; H04R 2227/005
USPC ....... 340/501, 309.16, 307.7, 539.11, 539.14
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |

(Continued)

FOREIGN PATENT DOCUMENTS

| | | |
|---|---|---|
| EP | 1389853 A1 | 2/2004 |
| WO | 03093950 A2 | 11/2003 |

OTHER PUBLICATIONS

"AudioTron Quick Start Guide, Version 1.0", Voyetra Turtle Beach, Inc., Mar. 2001, 24 pages.

(Continued)

*Primary Examiner* — Quan-Zhen Wang
*Assistant Examiner* — Stephen Burgdorf
(74) *Attorney, Agent, or Firm* — McDonnell Boehnen Hulbert & Berghoff LLP

(57) ABSTRACT

Embodiments are provided for displaying on a network device graphical display, an indication of an alarm, a media playback system playback zone associated with the alarm, and a control element for deactivating the alarm. The indication may be displayed in response to the network device receiving data indicating that the alarm is going off or is about to go off in the playback zone. A selection of the control element for deactivating the alarm may prompt a controller interface of the media playback system to be displayed on the graphical display, and the alarm may be deactivated via the controller interface. Alternatively, the selection of the control element may cause the alarm to be deactivated without displaying the controller interface. To deactivate the alarm, the network device may send to one or more playback devices in the playback zone, a transmission indicating that the alarm is to be deactivated.

20 Claims, 6 Drawing Sheets

(56) References Cited

U.S. PATENT DOCUMENTS

| | | |
|---|---|---|
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,483,538 B2 | 1/2009 | McCarty et al. |
| 7,492,253 B2 | 2/2009 | Ollis et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1* | 7/2013 | Lambourne ............... H04R 3/12 381/107 |
| 8,666,523 B2 | 3/2014 | Kim et al. |
| 8,717,181 B2* | 5/2014 | Tallent .................... G08B 21/22 340/573.4 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0089529 A1 | 7/2002 | Robbin |
| 2002/0124097 A1 | 9/2002 | Isely et al. |
| 2003/0157951 A1 | 8/2003 | Hasty |
| 2004/0024478 A1 | 2/2004 | Hans et al. |
| 2004/0154040 A1* | 8/2004 | Ellis .................... H04N 5/44543 725/58 |
| 2004/0175159 A1 | 9/2004 | Oetzel et al. |
| 2005/0240959 A1* | 10/2005 | Kuhn ..................... H04N 7/163 725/25 |
| 2006/0008256 A1 | 1/2006 | Khedouri et al. |
| 2006/0026521 A1 | 2/2006 | Hotelling et al. |
| 2006/0195480 A1 | 8/2006 | Spiegelman et al. |
| 2006/0225097 A1 | 10/2006 | Lawrence-Apfelbaum |
| 2007/0142944 A1 | 6/2007 | Goldberg et al. |
| 2007/0150830 A1 | 6/2007 | Ording et al. |
| 2007/0150918 A1* | 6/2007 | Carpenter ............... G06F 21/10 725/25 |
| 2008/0065235 A1* | 3/2008 | Igoe .................... H04L 12/2809 700/1 |
| 2009/0217356 A1* | 8/2009 | Scott ..................... G06F 21/604 726/4 |
| 2009/0243834 A1* | 10/2009 | Sennett ............ G08B 13/19682 340/506 |
| 2009/0288131 A1* | 11/2009 | Kandekar ......... G06F 17/30029 725/133 |
| 2011/0314497 A1* | 12/2011 | Warrick ................ H04W 76/02 725/38 |
| 2012/0233644 A1* | 9/2012 | Rao ..................... H04M 1/7253 725/62 |
| 2013/0143586 A1* | 6/2013 | Williams ........... G06Q 30/0261 455/456.1 |
| 2013/0332565 A1* | 12/2013 | Wang ..................... H04L 67/06 709/217 |
| 2014/0218517 A1* | 8/2014 | Kim .................... H04L 12/2818 348/143 |
| 2014/0259074 A1* | 9/2014 | Ansari ................ H04N 21/482 725/50 |
| 2014/0283142 A1* | 9/2014 | Shepherd ............. G06F 3/0482 726/30 |
| 2015/0097681 A1 | 4/2015 | Fadell et al. |
| 2015/0109128 A1 | 4/2015 | Fadell et al. |
| 2015/0339917 A1* | 11/2015 | Messing ................ G08C 17/02 340/12.5 |
| 2016/0150282 A1* | 5/2016 | Hirabayashi ....... H04N 21/4222 725/33 |

OTHER PUBLICATIONS

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Jo J., et al., "Synchronized One-to-many Media Streaming with Adaptive Playout Control," Proceedings of SPIE, 2002, vol. 4861, pp. 71-82.

"UPnP; "Universal Plug and Play Device Architecture"; Jun. 8, 2000; version 1.0; Microsoft Corporation; pp. 1-54".

"Bluetooth. "Specification of the Bluetooth System: The ad hoc Scatternet for affordable and highly functional wireless connectivity" Core, Version 1.0 A, Jul. 26, 1999, 1068 pages". (in four parts due to size).

"Bluetooth. "Specification of the Bluetooth System: Wireless connections made easy" Core, Version 1.0 B, Dec. 1, 1999, 1076 pages". (in four parts due to size).

"Dell, Inc. "Dell Digital Audio Receiver: Reference Guide" Jun. 2000, 70 pages". (in two parts due to size).

"Dell, Inc. "Start Here" Jun. 2000, 2 pages".

"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".

"Palm, Inc. "Handbook for the Palm VII Handheld" May 2000, 311 pages".

"Presentations at WinHEC 2000" May 2000, 138 pages.

"Denon 2003-2004 Product Catalog," Denon, 2003-2004, 44 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2003, entitled "Controlling and manipulating groupings in a multi-zone music or media system," 82 pages.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

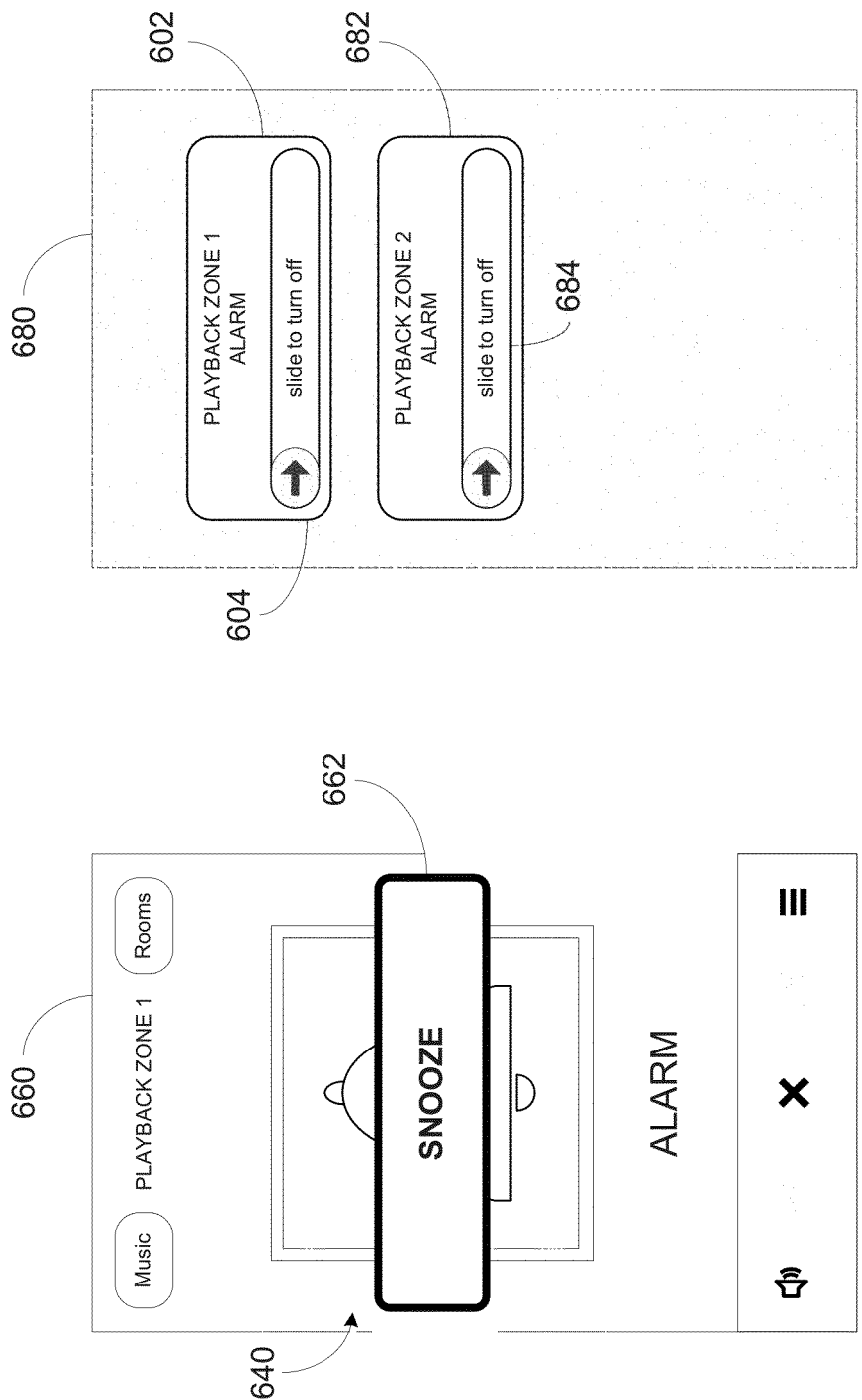

DISPLAY AND CONTROL OF PRE-DETERMINED AUDIO CONTENT PLAYBACK

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 6A-E show a series of illustrative example network device interfaces displaying a media playback system alarm.

Figure 1:
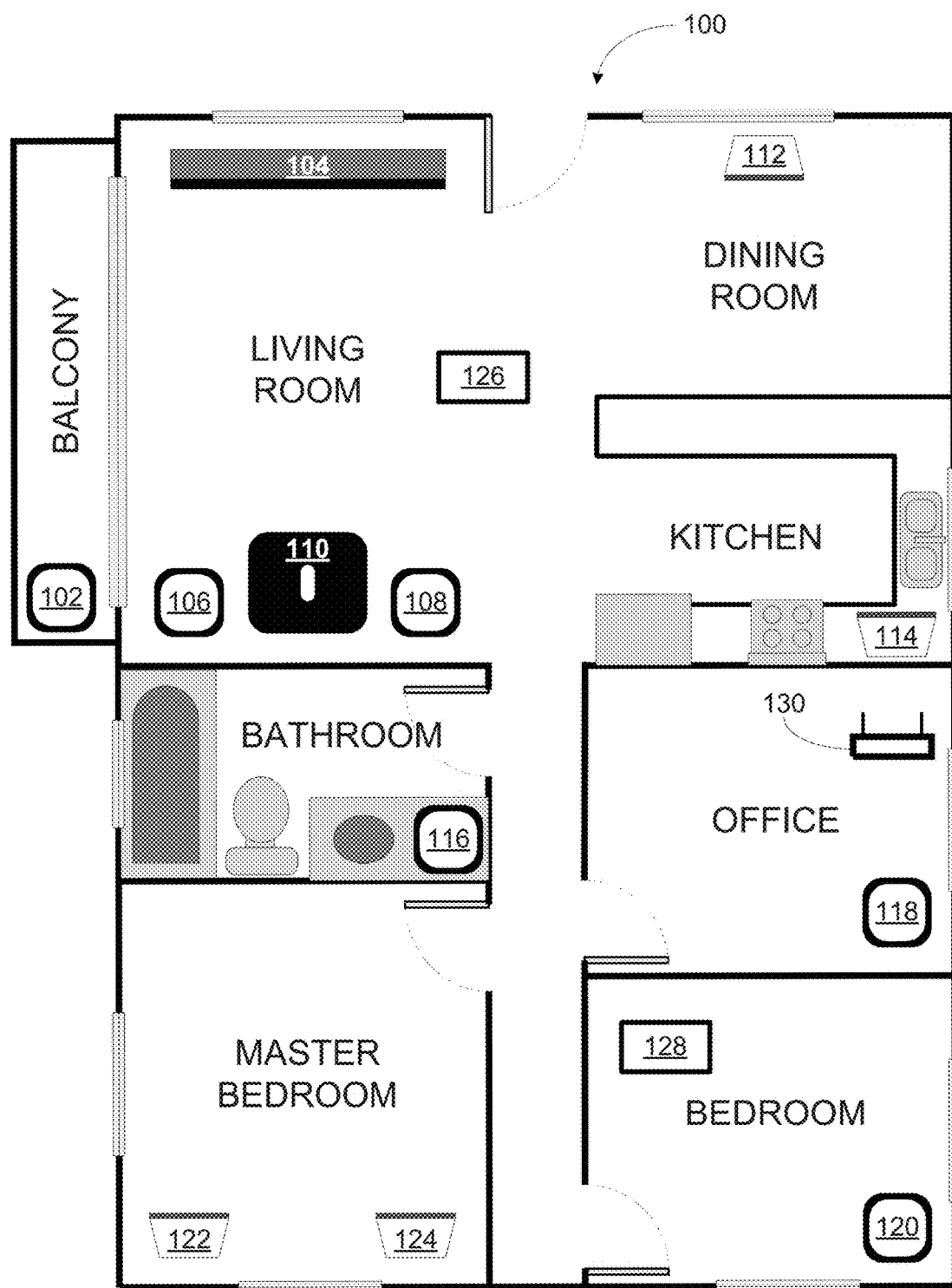
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In some examples described herein, an alarm may be set in a playback zone of a media playback system such that one or more playback devices in the playback zone begins to plays media content at a specified time. The media content may be one or more particular media items (i.e. music tracks, alarm audio tracks, etc.) or streaming media content (i.e. internet radio), among other examples. The alarm may be a single time alarm, or a recurring alarm. In an example, the alarm may be set via a network device used to control the media playback system.

Examples described herein involve displaying on a network device an indication of (i) an alarm that is going off or is about to go off, (ii) a media playback system playback zone associated with the alarm, and (iii) a control element for deactivating the alarm. The indication of the alarm, playback zone, and the control element may be displayed on a graphical display of a network device, such as a mobile device used to control the media playback system. The indication may be displayed in response to the network device receiving data indicating the alarm and the playback zone. Reception of the data may indicate that the alarm is going off or is about to go off. In other words, the indication of the alarm may serve as a notification interface of the alarm.

In one example, a selection of the control element may cause a controller interface of the media playback system to be displayed on the graphical display. The controller interface may automatically display information and control options for the playback zone associated with the alarm (as opposed to some other playback zone). Further, upon the selection of the control element, the alarm may be deactivated via the controller interface of the media playback system without additional navigation within the controller interface to access the particular playback zone. In some instances, the network device may be in a locked state when the indication is displayed. In one case, the selection of the control element to deactivate the alarm may also cause the network device to leave the locked state and enter an unlocked state, before subsequently displaying the controller interface.

In another example, a selection of the control element for deactivating the alarm may cause the alarm to be deactivated without displaying the controller interface and/or further interactions with the controller interface. In other words, the alarm may be deactivated directly from the notification interface of the alarm. In either case, the network device, upon receiving an input to deactivate the alarm, may send to one or more playback devices in the playback zone, a transmission indicating that the alarm is to be deactivated.

In one case, the network device may be subscribed to alarms associated with the playback zone and, as a result, may receive the data indicating the alarm. As such, the network device may receive data for every alarm associated with the playback zone. In another case, the network device may be configured to receive the data indicating the alarm because the network device was used to set up the alarm in the playback zone. In other words, the network device may receive data for each media playback system alarm that was set up using the network device. In yet another case, use of the network device to set up the alarm in the playback zone may subscribe the network device to all alarms associated with the playback zone. Other examples are also possible.

In some cases, multiple network devices may be subscribed to one or more alarms associated with a playback zone, and one or more of each such multiple network devices may receive data indicating one or more alarms that is going off or about to go off. As such, each of the multiple network devices may display an indication of (i) the alarm, (ii) a media playback system playback zone associated with the alarm, and (iii) a control element for deactivating the alarm. The alarm may then be deactivated via any one of the multiple network devices.

In other cases, one network device may be subscribed to alarms associated with one or more playback zones. As such, the network device may receive data indicating alarms that is going off or about to go off in the one or more playback zones. Further in some cases, multiple network devices may be subscribed to one or more alarms associated with a particular playback zone, and one or more of the multiple network devices may be subscribed to alarms associated with multiple playback zones, including the particular playback zone. Other examples are also possible.

As indicated above, the examples provided herein involve displaying an indication of an alarm, a media playback system playback zone associated with the alarm, and a control element for deactivating the alarm. In one aspect, a method is provided. The method involves receiving, by a network device, data indicating an alarm associated with at least one playback zone of a media playback system, and based on the received data indicating the alarm, causing, by the network device, a graphical display to display an indication of (i) the alarm, (ii) the at least one playback zone, and (iii) a control for deactivating the alarm.

In another aspect, a device is provided. The device includes a processor, and memory having stored thereon instructions executable by the processor to cause the device to perform functions. The functions include receiving data indicating an alarm associated with at least one playback zone of a media playback system, and based on the received data indicating the alarm, causing a graphical display to display an indication of (i) the alarm, (ii) the at least one playback zone, and (iii) a control for deactivating the alarm.

In yet another aspect, a non-transitory computer readable memory is provided. The non-transitory computer readable memory has stored thereon instructions executable by a computing device to cause the computing device to perform functions. The functions include receiving data indicating an alarm associated with at least one playback zone of a media playback system, and based on the received data indicating the alarm, causing a graphical display to display an indication of (i) the alarm, (ii) the at least one playback zone, and (iii) a control for deactivating the alarm.

While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
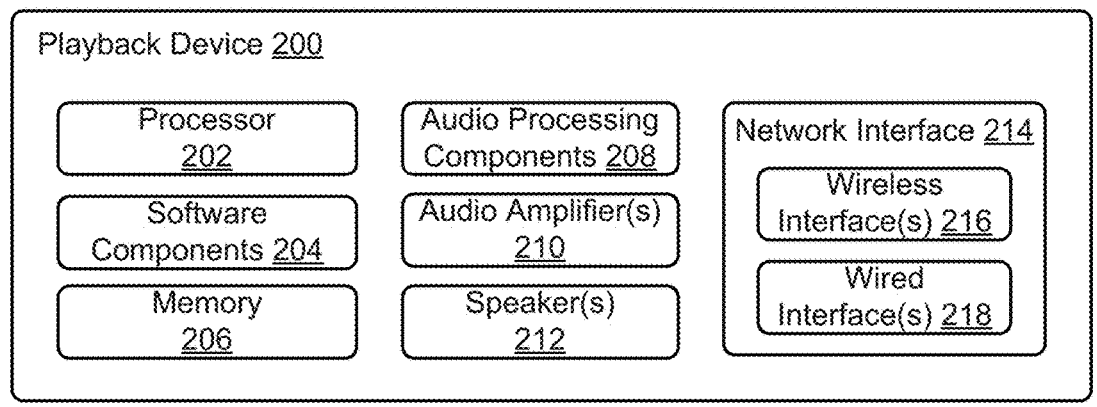
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
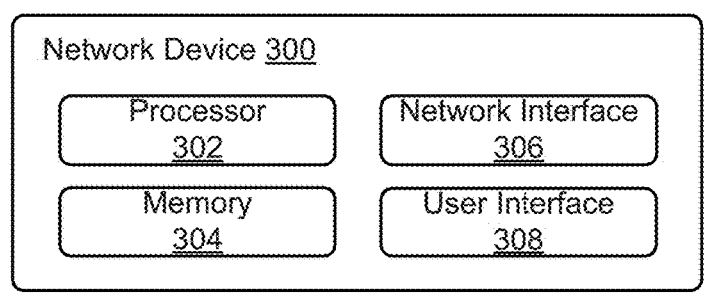
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
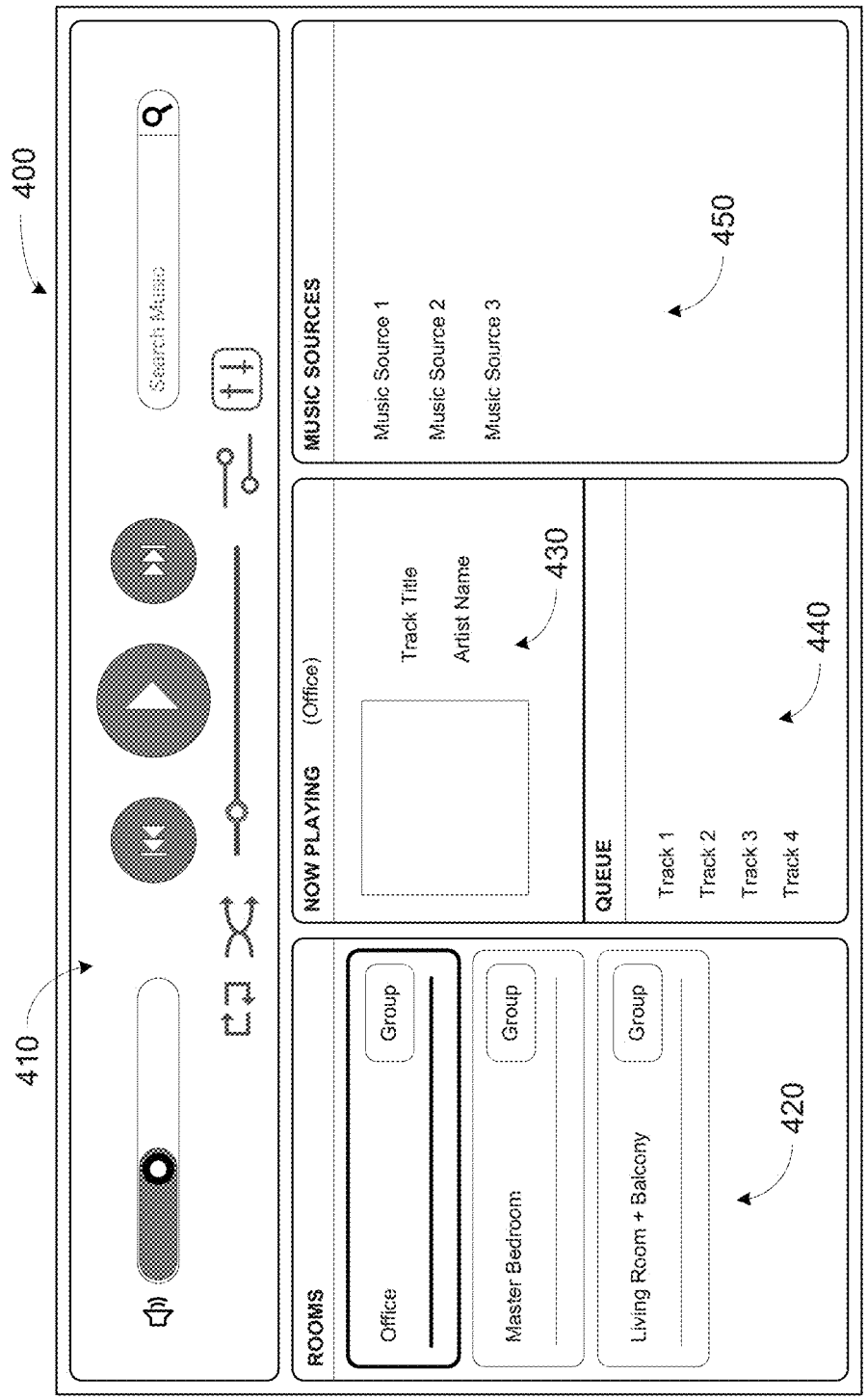
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Displaying an Indication of an Alarm

Figure 5:
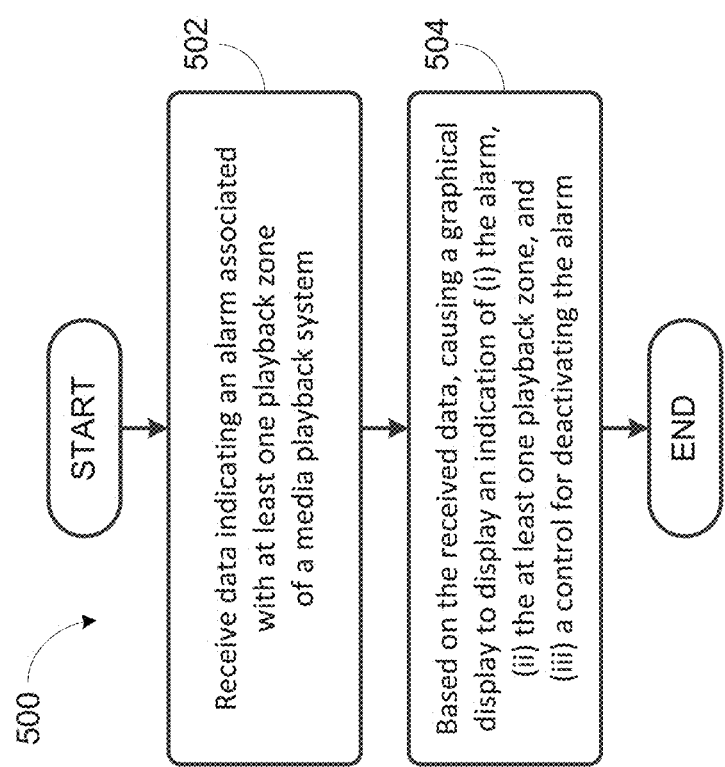
FIG. 5 shows an example flow diagram for displaying a media playback system alarm.

As discussed above, some embodiments described herein involve displaying on a graphical display of a network device, an indication of an alarm, a media playback system playback zone associated with the alarm, and a control element for deactivating the alarm. FIG. 5 shows an example method 500 for displaying the indication. Method 500 shown in FIG. 5 presents an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-504. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

At block 502, the method 500 involves a network device receiving data indicating an alarm associated with at least one playback zone of a media playback system. The media playback system may be a media playback system similar to the media playback system 100 discussed above in connection to FIG. 1, and the at least one playback zone may be one or more of the playback zones shown in FIG. 1. In one example, the at least one playback zone may include a single playback device, while in another example, the at least one playback zone may include multiple playback devices. The network device may be a computing device in communication with the media playback system over a network, such as the control device 300 discussed above in connection to FIG. 3. In one case, the network device may be a mobile device used to control the media playback system. The network device may, based on the received data indicating the alarm, execute a controller application for controlling the media playback system if the controller application was not already being executed. The controller application may be executed in the background, and the network device may interface with the controller application to process the received data indicating the alarm.

The data indicating the alarm may be received from one or more devices in communication with the media playback system and the network device. In one example, the data may be received from one or more playback devices of the at least one playback zone. For instance, the data may be received from a group coordinator of the at least one playback zone. In another example, the data may be received from a remote server associated with the media playback system. In a further example, the data may be received from another network device in communication with the media playback system. In one case, the other network device may be a local server or computing device configured to manage alarms associated with the media playback system.

The data indicating the alarm may be received by the network device because the network device is subscribed to the alarm. In one example, prior to receiving the data indicating the alarm, the network device may send to a device in the at least one playback zone, an indication that the network device is subscribed to receive alarms associated with the at least one playback zone. In one case, the device in the at least one playback zone may modify a state variable to indicate the subscription of the network device to alarms associated with the playback zone. In this way, data indicating any alarms associated with the playback zone may ultimately be transmitted to the network device. Accordingly, the network device may subsequently receive data indicating one or more alarms associated with the at least one playback zone.

In some cases, the device in the at least one playback zone may send to other devices in the at least one playback zone and/or the broader media playback system, a transmission indicating that the network device is subscribed to receive alarms associated with the at least one playback zone. The other devices may accordingly modify respective state variables in response. The transmission may further be sent to a remote system server associated with the media playback system, where respective state variables may also be updated accordingly.

Alternatively, in one embodiment, the device may broadcast the data indicating the alarm to any network device associated with the media playback system. In one case, a network device may react to the broadcasted data if the network device is subscribed to the alarm, or may ignore the broadcasted data if the network device is not subscribed to the alarm.

In one example, the network device may receive the data indicating the alarm only if the network device is within a physical proximity of the playback zone associated with the alarm. For instance, the network device may only receive the data if the network device is on a same local area network as the media playback system. As such, the network device may deactivate the alarm associated with the playback zone only if the user is within general physical proximity of the playback zone (e.g., within the house).

In another example, the network device may receive the data indicating the alarm as long as the network device and media playback system are capable of communicating with each other. For instance, the network device and the media playback system may communicate over a wide area network. As such, if the network device is a personal mobile device of a user, the network device may be used to deactivate the alarm associated with the playback zone even if the user is physically remote from the playback zone (e.g., travelling, or out of the house).

In another example, prior to receiving the data indicating the alarm, the network device may send to a device in the at least one playback zone, data to set up the alarm. The data to set up the alarm may indicate a time when the alarm is to begin, media content to be played when the alarm is to begin, and whether the alarm is a recurring alarm or a one-time alarm, among other examples. In some cases, the data may further indicate whether the alarm is a private alarm only accessible via the network device sending the device, or a public alarm accessible via some or all other network devices in communication with the media playback system.

The network device may then receive a transmission indicating that the alarm has been set up. In one instance, the network device may be automatically subscribed to the alarm because the network device was used to set up the alarm. In one case, the network device may be subscribed to all alarms associated with the at least one playback zone, including alarms associated with the at least one playback zone that was not set up via the network device. In another case, the network device may be subscribed to only the particular alarm in the at least one playback zone that was set up via the network device, whether or not other alarms are associated with the at least one playback zone.

In either example, the device may be, as discussed above, a device configured to manage alarms associated with the media playback system, such as a playback device in the at least one playback zone, a group coordinator, remote server, local server, or another network device, among other possibilities.

In one example, the data indicating the alarm may be received by the network device when the alarm begins to go off. For instance, the device in the playback zone that the alarm is associated with may transmit the data indicating the alarm when the alarm begins to go off. In another example, the data indicating the alarm may be received by the network device prior to a time that the alarm is set to begin. In one case, the data may be received before a predetermined amount of time before the time the alarm is set to begin. For instance, the data may be received 10 seconds before the time the alarm is set to begin. For instance, the device in the playback zone that the alarm is associated with may transmit the data indicating the alarm a certain amount of time before the alarm is about to go off, such that the network device may receive the data before the predetermined amount of time.

The predetermined amount of time may allow the network device to process the data indicating the alarm before the alarm is set to begin. For instance, the network device may determine, based on the received data, that the alarm is associated with the at least one playback zone. In one case, the received data may specify the at least one playback zone, and the network device may accordingly determine that the alarm is associated with the at least one playback zone. In another case, the received data may identify a playback device that is associated with the alarm, and/or a playback device from which the data was transmitted, and the network device may accordingly determine that the alarm is associated with the at least one playback zone based on the identified playback device.

In another instance, the data indicating the alarm may further include time information associated with the at least one playback zone. In one case, processing the data indicating the alarm before the alarm is set to begin may involve comparing the time information associated with the at least one playback zone and a time of the network device. As such, the network device may confirm that the time information associated with the at least one playback zone and the time of the network device are the same (accounting for differences in time zones and/or device processor clocks and clock rates).

The predetermined amount of time may also account for any differences between clocks of the device in the playback zone and the network device, and/or clocks of the one or more devices in the playback zones. The predetermined amount of time may further account for data transmission latency between the device in the playback zone, devices in the media playback system, and the network device.

The network device may accordingly cause an indication of the alarm to be displayed based on one or more of the identified at least one playback zone, the time information associated with the at least one playback zone, and the time of the network device.

At block 504, the method 500 involves, based on the received data, causing a graphical display to display an indication of (i) the alarm, (ii) the at least one playback zone, and (iii) a control for deactivating the alarm. In one example, the indication may be displayed when the alarm is set to begin. In another example, the indication may be displayed a predetermined time before a time that the alarm is set to begin. For instance, the indication may be displayed when the data indicating the alarm is received and/or processed.

In one example, the network device may be in a locked state. The network device may be in the locked state for security purposes. For instance, the network device may enter a locked state if no user interaction with the network device occurs for a predetermined duration of time. In one case, functions available via the network device may be limited while the network device is in the locked state. For instance, while the network device is in the locked state, only a portion of the indication of i) the alarm, (ii) the at least one playback zone, and (iii) a control for deactivating the alarm may be displayed on the graphical display. In some cases, one or more running applications may become inactive when the network device enters the locked state. In some cases, running applications may continue to be active while the network device is in the locked state. While in a locked state, the interface provided on the graphical display may be referred to as a lock screen.

While in the locked state, the network device may be unlocked via an interaction with the locked screen. In one example, the interaction may involve the network device receiving a passcode or password as a credential to access the functions of the network device in the unlocked state. In one example, upon entering the unlocked state, the entire indication of i) the alarm, (ii) the at least one playback zone, and (iii) a control for deactivating the alarm may be displayed on the graphical display. If applications become inactive when the network device enters the locked state, in one case, inactive applications may become active upon the network device entering the unlocked state. Other examples are also possible.

Figure 6C:
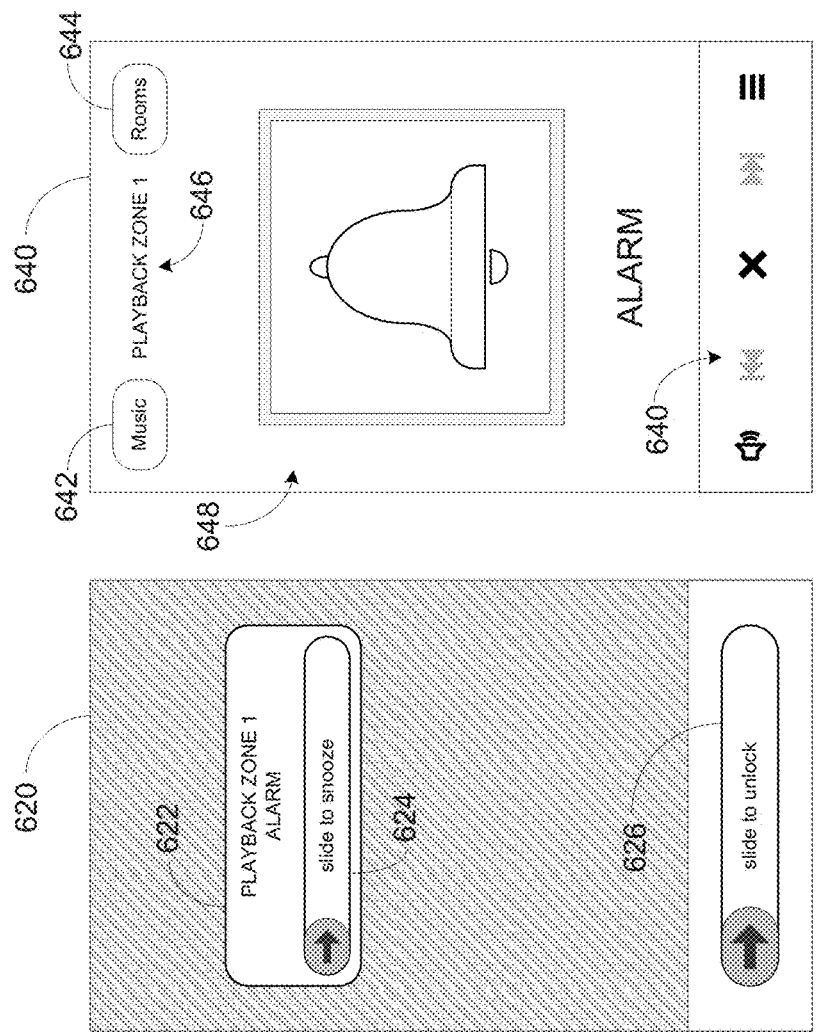
Figure 6B:
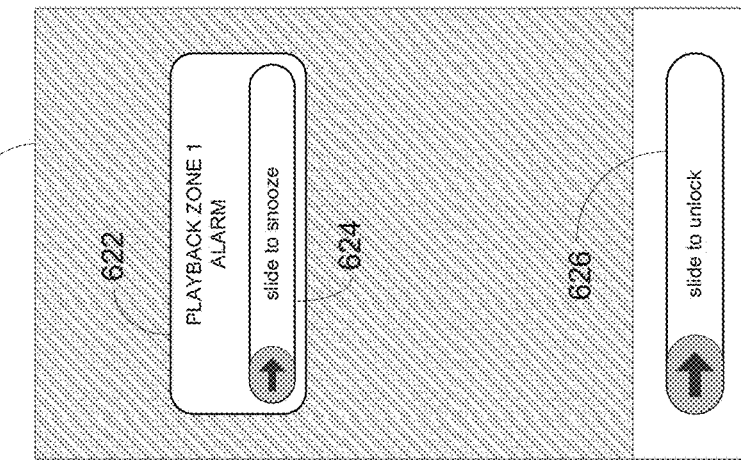
Figure 6A:
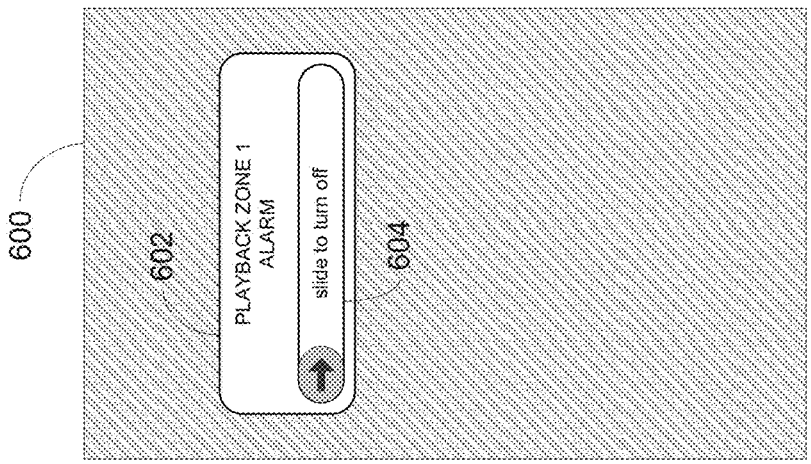

FIG. 6A shows a first illustrative example network device interface 600 on which the indication of (i) the alarm, (ii) the at least one playback zone, and (iii) the control for deactivating the alarm is displayed. As shown in FIG. 6A, an alarm notification 602 is displayed. In one example, if the network device is in a locked state, the notification 602 may be displayed on a lock screen of the network device.

If the network device is in an unlocked state, the notification 602 may be displayed on the unlocked screen of the network device. In some cases, the notification 602 may be displayed on the unlocked screen even if another application and/or interface is active on the network device. In addition, or alternatively, if an interface of the network device includes a notification bar or notification panel, an icon indicating the alarm may be displayed in the notification bar or notification panel. Other examples are also possible.

As shown, the alarm notification 602 indicates that an alarm associated with "Playback Zone 1" is going off or about to go off. In one case, if the alarm notification 602 is displayed before the alarm is set to go off, the alarm notification 502 may further include a countdown timer indicating a time until the alarm goes off (not shown in FIG. 6A). The alarm notification 602 also includes an illustrative control element 604. The control element 604 may be a slider selectable to turn off the alarm. As shown, the control element 604 indicates "slide to turn off" as a means to select the slider to turn off the alarm.

In one example, selection of the control element 604 may cause the alarm to be deactivated. In one case, deactivation of the alarm may involve disabling the alarm until the alarm is activated again. In another case, deactivation of the alarm may involve snoozing, or postponing the alarm for a set amount of time, such as five minutes, once the alarm has begun.

In another example, selection of the control element 604 may cause a controller interface for the media playback system to be executed (if not already being executed) and be displayed on the graphical display. The controller interface may then be used to deactivate or otherwise manage and modify the alarm.

FIG. 6B shows a second illustrative example network device interface 620. The network device interface 620 includes an alarm notification 622 that is similar to the alarm notification 602. Instead of "slide to turn off," the alarm notification 622 includes a control element 624 that indicates "slide to snooze," as a means to select the control element 624 to deactivate the alarm by postponing the alarm for a set amount of time once the alarm has begun. The control element 624 in this case may be displayed when the alarm is already going off. In one example, the network device may first display the alarm notification 602 with the control element 604 before the alarm begins, and subsequently display the alarm notification 622 with the control element 624 once the alarm has begun.

As shown, the example network device interface 620 also includes a control element 626 for unlocking the network device. In one example, the control element 626 for unlocking the network device may be displayed after and/or in response to receiving the data indicating the alarm. As indicated above, the network device may be in a locked state or an unlocked state when the indication of (i) the alarm, (ii) the at least one playback zone, and (iii) the control for deactivating the alarm is displayed. In the case the network device is in a locked state, the control element 626 may be displayed, indicating "slide to unlock" as a means to unlock the network device. In this case, the network device may, based on a selection of the control element 626, cause the network device to enter an unlocked state, and display the controller interface for the media playback system. In some cases, the network device, upon receiving the selection of the control element 626, may display a prompt for a PIN or password, and only enter the unlocked state (and display the controller interface) when a qualifying PIN or password is received.

FIG. 6C shows a third illustrative example network device interface 640, which includes an example controller interface for the media playback system. As shown, the controller interface for the media playback system may include a "Music" icon 642 to view music sources, similar to that shown in the audio content sources region 450 of FIG. 4, a "Rooms" icon 644 to view different playback zones in the media playback system, similar to that shown in the audio content sources region 450 of FIG. 4, and a playback status region 648 similar to the playback status region 430 of FIG. 4. The controller interface may also include a playback control region 640 similar to the playback control region 440 of FIG. 4. In this case however, the playback control region 640 may include an "X" icon to deactivate the alarm, rather than a play/pause icon like that shown in FIG. 4. The controller interface may also include a playback zone identifier 646 indicating that "Playback Zone 1" is the playback zone for which information displayed in the playback status region 648 and controls in the playback control region 640 are applicable.

In one example, the controller interface shown in the example network device interface 640 may be an example of the controller interface displayed before the alarm is set to begin. In this case, the "X" icon in the playback control region 640 may be selected to deactivate the alarm. FIG. 6D shows a fourth illustrative example network device interface 660 displaying an example controller interface for the media playback system. The example controller interface in this case may include a "Snooze" control element 662 overlaying the playback status region 648 of the example network device interface 640 of FIG. 6C. In one example, the controller interface shown in the example network device interface 660 may be an example of the controller interface displayed once the alarm has begun. In this case, the control element 662 may be selected to deactivate the alarm by postponing the alarm for a set amount of time once the alarm has begun.

Referring back to FIG. 5, after the indication of (i) the alarm, (ii) the at least one playback zone, and (iii) a control for deactivating the alarm are displayed, a selection of the control for deactivating the alarm may be received by the network device. As indicated above, deactivation of the alarm may involve disabling the alarm until the alarm is activated again or snoozing the alarm.

In either case, the network device may, based on the selection of the control for deactivating the alarm, send to a playback device that is part of the at least one playback zone, a command to deactivate the alarm. The playback device, upon receiving the command, may update a state variable associated with the alarm to indicate that the alarm has been deactivated. In the case the alarm is a recurring alarm, the state variable may indicate that the alarm has been deactivated until a next time the alarm is configured to go off.

In one example, the network device may send the command to the one or more devices from which the data indicating the alarm was received. In another example, the command may be sent to one or more playback devices in the at least one playback zone. For instance, the command may be sent to the group coordinator of the at least one playback zone. In some cases, the network device may send the command directly to the one or more playback devices in the at least one playback zone. In some other cases, the network device may send the command to the one or more playback devices via a remote server associated with the media playback system, or a local server or computing device configured to manage alarms associated with the media playback system. Upon receiving the command to deactivate the alarm, the one or more playback devices in the at least one playback zone may accordingly deactivate the alarm, whether deactivation of the alarm involves disabling the alarm or snoozing the alarm. Other examples are also possible.

While the above examples are generally directed to one network device and at least one playback zone, one having ordinary skill in the art will appreciate that implementations of the above examples may be modified and/or expanded to include multiple network devices and multiple alarms in multiple playback zones or zone groups.

In one example, the at least one playback zone discussed above is a first at least one playback zone, and the alarm associated with the first at least one playback zone is a first alarm. In this case, a modified implementation of the method 500 may further involve receiving, by the network device, data indicating a second alarm associated with a second at least one playback zone of the media playback system, and based on the received data indicating the second alarm, causing, by the network device, the graphical display to display an indication of (i) the second alarm, (ii) the second at least one playback zone, and (iii) a control element for deactivating the second alarm. In other words, the network device may be subscribed to a second alarm in a second at least one playback zone.

FIG. 6E shows a fifth example network device interface 680 on which indications of the second alarm may be displayed on the graphical display of the network device. As shown, the network device interface 680 includes the alarm notification 602 as shown in FIG. 6A as well as a second alarm notification 682 for the second alarm in the second at least one playback zone "Playback Zone 2." The second alarm notification 682 may include a control element 684 for deactivating the second alarm. In one case, if the control element 684 is selected, a controller interface displaying playback status information and playback controls applicable to Playback Zone 2 may be displayed. On the other hand, as discussed above, if the control element 604 is selected, the controller interface, as shown in FIGS. 6C and 6D that display playback status information and playback controls applicable to Playback Zone 1 may be displayed. Other examples are also possible.

In another example, the network device discussed above is a first network device, and the graphical display is a first graphical display. In this case, a modified implementation of the method 500 may further involve receiving, by a second network device, data indicating the alarm associated with the at least one playback zone of the media playback system, and based on the received data indicating the alarm, causing, by the second network device, a second graphical display to display an indication of (i) the alarm, (ii) the at least one playback zone, and (iii) a control element for deactivating the second alarm. In other words, a separate network device may also be subscribed to the same alarm discussed above.

In a further example, the network device discussed above is a first network device, the at least one playback zone may be a first at least one playback zone, and the alarm associated with the first at least one playback zone is a first alarm. In this case, an expanded implementation of the method 500 may further involve receiving, by a second network device, data indicating a second alarm associated with a second at least one playback zone of the media playback system, and based on the received data indicating the second alarm, causing, by the second network device, a graphical display of the second network device to display an indication of (i) the second alarm, (ii) the second at least one playback zone, and (iii) a control element for deactivating the second alarm. In other words, a second network device different from the network device described above in connection to FIGS. 5 and 6A-6D may be subscribed to a separate alarm in a separate at least one playback zone. Other examples are also possible.

One having ordinary skill in the art will appreciate that the examples, example interfaces, and elements of the example interfaces are for illustration purposes and not meant to be limiting. Embodiments in which one or more elements from the example interfaces described herein are removed and/or combined are also possible. For instance, in one example, the network device may be in a locked state, and may receive data indicating an alarm (similar to that described in connection to block 502), and based on the received data, display on the graphical display a lock screen that includes an indication of a control element for unlocking the network device (such as control element 626 of FIG. 6B). In one case, the lock screen may also include an indication that the alarm is going off or about to go off, but may not include any control elements for deactivating the alarm. In this example, the network device may, based on a selection of the control element for unlocking the network device, cause the graphical display to display a controller interface (such as that shown in FIGS. 6C and 6D) that includes an indication of (i) the alarm, (ii) the at least one playback zone, and (iii) the control element for deactivating the alarm. The controller interface may then be used to deactivate the alarm. In one case, receiving the data indicating the alarm may cause the network device to execute the controller interface, prior to receiving the selection of the control element for unlocking the network device that causing the network device to enter an unlocked state.

In addition, while the above examples are generally directed to playback devices in a media playback system, one having ordinary skill in the art will appreciate that the embodiments discussed herein may also be implemented within various devices and/or systems. Other examples are also possible.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the examples provided herein involve displaying an indication of an alarm, a media playback system playback zone associated with the alarm, and a control element for deactivating the alarm. In one aspect, a method is provided. The method involves receiving, by a network device, data indicating an alarm associated with at least one playback zone of a media playback system, and based on the received data indicating the alarm, causing, by the network device, a graphical display to display an indication of (i) the alarm, (ii) the at least one playback zone, and (iii) a control for deactivating the alarm.

In another aspect, a computing device is provided. The computing device includes a processor, and memory having stored thereon instructions executable by the processor to cause the device to perform functions. The functions include receiving data indicating an alarm associated with at least one playback zone of a media playback system, and based on the received data indicating the alarm, causing a graphical display to display an indication of (i) the alarm, (ii) the at least one playback zone, and (iii) a control for deactivating the alarm.

In yet another aspect, a non-transitory computer readable memory is provided. The non-transitory computer readable memory has stored thereon instructions executable by a computing device to cause the computing device to perform functions. The functions include receiving data indicating an alarm associated with at least one playback zone of a media playback system, and based on the received data indicating the alarm, causing a graphical display to display an indication of (i) the alarm, (ii) the at least one playback zone, and (iii) a control for deactivating the alarm.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A method comprising:
   at a predetermined duration of time prior to a predetermined time, receiving, by a first network device from a media playback system, data indicating that playback of particular audio content is scheduled to begin at the predetermined time by one or more playback devices in a playback zone of the media playback system, wherein the at least one of the one or more playback devices in the playback zone is a group coordinator of the playback zone, and wherein prior to the first network device receiving the data, the media playback system received from a second network device, a message indicating (i) the particular audio content, (ii) the playback zone, and (iii) the predetermined time;
   based on the received data, causing, by the first network device, a graphical display to display an indication of a control element for unlocking the first network device;
   receiving a selection of the control element for unlocking the first network device; and
   based on the selection of the control element for unlocking the first network device, causing the graphical display to display an indication of: (i) the playback of the particular audio content at the predetermined time, (ii) the playback zone, and (iii) a control element for deactivating the playback of the particular audio content before playback of the particular audio content at the predetermined time begins in the playback zone.

2. The method of claim 1, wherein causing, by the first network device, the graphical display to display the indication of (i) the playback of the particular audio content at the predetermined time, (ii) the playback zone, and (iii) the control element for deactivating the playback of the particular audio content before playback of the particular audio content at the predetermined time begins in the playback zone comprises:
   executing, by the first network device, a controller interface for controlling the media playback system.

3. The method of claim 1, further comprises:
   after causing the graphical display to display the indication of the control element for deactivating the playback of the particular audio content at the predetermined time and before the predetermined time, receiving via the first network device, an input indicating a selection of the control element for deactivating the playback of audio content at the predetermined time; and
   based on the input and prior to the predetermined time, sending to the at least one of the one or more playback devices in the playback zone, a command to deactivate the playback of audio content at the predetermined time.

4. The method of claim 1, wherein the data indicating the playback of the particular audio content at the predetermined time further comprises time information corresponding to the one or more playback devices in the playback zone, and wherein causing the graphical display to display the indication of (i) the playback of the particular audio content at the predetermined time, (ii) the playback zone, and (iii) the control element for deactivating the playback of the particular audio content at the predetermined time is based on (a)

the time information associated with the playback zone and (b) a time of the first network device.

5. The method of claim 1, further comprising:
before receiving the data indicating the playback of the particular audio content at the predetermined time, sending, by the first network device to a playback device in the playback zone, an indication that the first network device is subscribed to receive data indicating predetermined playbacks of audio content corresponding to the playback zone.

6. The method of claim 1, wherein the playback zone is a first playback zone, wherein the playback of the particular audio content at the predetermined time associated with the first playback zone is a first playback of the particular audio content at a first predetermined time, the method further comprising:
receiving, by the first network device, data indicating a second playback of audio content at a second predetermined time by one or more playback devices of a second playback zone of the media playback system; and
based on the received data indicating the second playback of audio content at the second predetermined time by the one or more playback devices of the second playback zone, causing, by the first network device, the graphical display to display an indication of (i) the second playback of audio content at the predetermined time, (ii) the second playback zone, and (iii) a control element for deactivating the second playback of audio content at the predetermined time.

7. The method of claim 1, wherein the playback of the particular audio content at the predetermined time is a first playback of the particular audio content at a first predetermined time, the method further comprising:
receiving, by the second network device, data indicating a second playback of audio content at a second predetermined time by one or more playback devices in a second playback zone of the media playback system; and
based on the received data indicating the second playback of audio content at the second predetermined time by the one or more playback devices of the second playback zone, causing, by the second network device, a graphical display of the second network device to display an indication of (i) the second playback of audio content at the second predetermined time, (ii) the second playback zone, and (iii) a control element for deactivating the second playback of audio content at the second predetermined time.

8. The method of claim 1, wherein the graphical display is a first graphical display, the method further comprising:
receiving, by the second network device, the data indicating the playback of the particular audio content at the predetermined time; and
based on the received data indicating the playback of the particular audio content at the predetermined time, causing, by the second network device, a second graphical display to display an indication of (i) the playback of the particular audio content at the predetermined time, (ii) the playback zone, and (iii) a control element for deactivating the playback of the particular audio content at the predetermined time.

9. A first device comprising:
one or more processors; and
tangible, non-transitory computer-readable memory having stored thereon instructions that, when executed by the one or more processors, cause the first device to perform functions comprising:
at a predetermined duration of time prior to a predetermined time, receiving from a media playback system, data indicating that playback of particular audio content is scheduled to begin at the predetermined time by one or more playback devices in a playback zone of the media playback system, wherein the at least one of the one or more playback devices in the playback zone is a group coordinator of the playback zone, and wherein prior to the first device receiving the data, the media playback system received from a second device, a message indicating (i) the particular audio content, (ii) the playback zone, and (iii) the predetermined time;
based on the received data, causing a graphical display to display an indication of a control element for unlocking the first device;
receiving a selection of the control element for unlocking the first device; and
based on the selection of the control element for unlocking the first device, causing the graphical display to display an indication of: (i) the playback of the particular audio content at the predetermined time, (ii) the playback zone, and (iii) a control element for deactivating the playback of the particular audio content before playback of the particular audio content at the predetermined time begins in the playback zone.

10. The first device of claim 9, wherein causing the graphical display to display the indication of (i) the playback of the particular audio content at the predetermined time, (ii) the playback zone, and (iii) the control element for deactivating the playback of the particular audio content at the predetermined time comprises:
executing a controller interface for controlling the media playback system.

11. The first device of claim 9, wherein the functions further comprise:
after causing the graphical display to display the indication of the control element for deactivating the playback of the particular audio content at the predetermined time and before the predetermined time, receiving via the first device, an input indicating a selection of the control element for deactivating the playback of audio content at the predetermined time; and
based on the input and prior to the predetermined time, sending to the at least one of the one or more playback devices in the playback zone, a command to deactivate the playback of audio content at the predetermined time.

12. The first device of claim 9, wherein the functions further comprise:
before receiving the data indicating the playback of the particular audio content at the predetermined time, sending, by the first device to a playback device in the playback zone, an indication that the first device is subscribed to receive data indicating predetermined playbacks of audio content corresponding to the playback zone.

13. The first device of claim 9, wherein the playback zone is a first playback zone, wherein the playback of the particular audio content at the predetermined time associated with the first playback zone is a first playback of the particular audio content at a first predetermined time, the functions further comprising:

receiving, by the first device, data indicating a second playback of audio content at a second predetermined time by one or more playback devices of a second playback zone of the media playback system; and based on the received data indicating the second playback of audio content at the second predetermined time by the one or more playback devices of the second playback zone, causing, by the first device, the graphical display to display an indication of (i) the second playback of audio content at the second predetermined time, (ii) the second playback zone, and (iii) a control element for deactivating the second playback of audio content at the second predetermined time.

14. The first device of claim 9, wherein the data indicating the playback of the particular audio content at the predetermined time further comprises time information corresponding to the one or more playback devices in the playback zone, and wherein causing the graphical display to display the indication of (i) the playback of the particular audio content at the predetermined time, (ii) the playback zone, and (iii) the control element for deactivating the playback of the particular audio content at the predetermined time is based on (a) the time information associated with the playback zone and (b) a time of the first device.

15. Tangible, non-transitory computer readable medium having stored thereon instructions, when executed by one or more processors, cause a first computing device to perform functions comprising:

at a predetermined duration of time prior to a predetermined time, receiving from a media playback system, data indicating that playback of a particular audio content is scheduled to begin at the predetermined time by one or more playback devices in a playback zone of the media playback system, wherein the at least one of the one or more playback devices in the playback zone is a group coordinator of the playback zone, and wherein prior to the first computing device receiving the data, the media playback system received from a second computing device, a message indicating (i) the particular audio content, (ii) the playback zone, and (iii) the predetermined time;

based on the received data, causing a graphical display to display an indication of a control element for unlocking the first computing device;

receiving a selection of the control element for unlocking the first computing device; and based on the selection of the control element for unlocking the first computing device, causing the graphical display to display an indication of: (i) the playback of the particular audio content at the predetermined time, (ii) the playback zone, and (iii) a control element for deactivating the playback of the particular audio content before playback of the particular audio content at the predetermined time begins in the playback zone.

16. The non-transitory computer readable medium of claim 15, wherein the functions further comprise:

after causing the graphical display to display the indication of the control element for deactivating the playback of the particular audio content at the predetermined time and before the predetermined time, receiving via the first computing device, an input indicating a selection of the control element for deactivating the playback of audio content at the predetermined time; and based on the input and prior to the predetermined time, sending to the at least one of the one or more playback devices in the playback zone, a command to deactivate the playback of audio content at the predetermined time.

17. The non-transitory computer readable medium of claim 15, wherein the playback zone is a first playback zone, wherein the playback of the particular audio content at the predetermined time associated with the first playback zone is a first playback of the particular audio content at a first predetermined time, the functions further comprising:

receiving, by the first computing device, data indicating a second playback of audio content at a second predetermined time by one or more playback devices of a second playback zone of the media playback system; and based on the received data indicating the second playback of audio content at the second predetermined time by the one or more playback devices of the second playback zone, causing, by the first computing device, the graphical display to display an indication of (i) the second playback of audio content at the second predetermined time, (ii) the second playback zone, and (iii) a control element for deactivating the second playback of audio content at the second predetermined time.

18. The non-transitory computer readable medium of claim 15, wherein the data indicating the playback of the particular audio content at the predetermined time further comprises time information corresponding to the one or more playback devices in the playback zone, and wherein causing the graphical display to display the indication of (i) the playback of the particular audio content at the predetermined time, (ii) the playback zone, and (iii) the control element for deactivating the playback of the particular audio content at the predetermined time is based on (a) the time information associated with the playback zone and (b) a time of the first computing device.

19. The non-transitory computer readable medium of claim 15, wherein the functions further comprise:

before receiving the data indicating the playback of the particular audio content at the predetermined time, sending, by the first computing device to a playback device in the playback zone, an indication that the first computing device is subscribed to receive data indicating predetermined playbacks of audio content corresponding to the playback zone.

20. The non-transitory computer readable medium of claim 15, wherein causing, by the first computing device, the graphical display to display the indication of (i) the playback of the particular audio content at the predetermined time, (ii) the playback zone, and (iii) the control element for deactivating the playback of the particular audio content before playback of the particular audio content at the predetermined time begins in the playback zone comprises:

executing, by the first computing device, a controller interface for controlling the media playback system.

* * * * *